United States Patent
Doerksen et al.

(10) Patent No.: US 11,840,303 B2
(45) Date of Patent: Dec. 12, 2023

(54) SUSPENSION SYSTEM FOR A ONE-WHEELED VEHICLE

(71) Applicant: Future Motion, Inc., Santa Cruz, CA (US)

(72) Inventors: Kyle Jonathan Doerksen, Santa Cruz, CA (US); Matthew Michael O'Brien, Seattle, WA (US)

(73) Assignee: FUTURE MOTION, INC., Santa Cruz, CA (US)

( * ) Notice: Subject to any disclaimer, the term of this patent is extended or adjusted under 35 U.S.C. 154(b) by 133 days.

(21) Appl. No.: 17/346,014

(22) Filed: Jun. 11, 2021

(65) Prior Publication Data

US 2022/0396330 A1 Dec. 15, 2022

(51) Int. Cl.
*B62K 11/00* (2006.01)
*B62K 1/00* (2006.01)
*B62K 25/00* (2006.01)
*B62J 25/06* (2020.01)

(52) U.S. Cl.
CPC ............ *B62K 11/007* (2016.11); *B62J 25/06* (2020.02); *B62K 1/00* (2013.01); *B62K 25/00* (2013.01)

(58) Field of Classification Search
CPC ........ B62K 11/007; B62K 1/00; B62K 25/00; B62J 25/06
See application file for complete search history.

(56) References Cited

U.S. PATENT DOCUMENTS

| | | | |
|---|---|---|---|
| 4,505,477 A | 3/1985 | Wilkinson | |
| 5,553,881 A * | 9/1996 | Klassen | B62K 25/286 280/283 |
| 6,390,488 B1 * | 5/2002 | Wallingsford | B62J 25/06 296/75 |
| 6,797,894 B2 * | 9/2004 | Montagnino | G01G 21/22 177/253 |
| 7,172,044 B2 * | 2/2007 | Bouvet | A63C 17/12 180/181 |
| 7,424,927 B2 * | 9/2008 | Hiramatsu | A63C 17/08 180/21 |
| 7,479,097 B2 | 1/2009 | Rosborough et al. | |
| 7,811,217 B2 * | 10/2010 | Odien | A63C 17/12 482/34 |
| 7,827,704 B2 * | 11/2010 | Fox | B29C 37/0032 36/154 |
| 9,097,598 B2 | 8/2015 | Grassi | |
| 9,101,817 B2 * | 8/2015 | Doerksen | G01P 15/18 |
| 9,387,363 B1 | 7/2016 | Polinsky | |
| 9,452,345 B2 * | 9/2016 | Doerksen | A63C 17/01 |

(Continued)

FOREIGN PATENT DOCUMENTS

CN 102527024 A 7/2012
CN 105774992 A 7/2016

*Primary Examiner* — Paul N Dickson
*Assistant Examiner* — Timothy Wilhelm
(74) *Attorney, Agent, or Firm* — Kolitch Romano Dascenzo Gates LLC

(57) ABSTRACT

A self-propelled, one-wheeled vehicle includes a suspension system configured to dampen up-and-down motion of a board relative to the axle of a central wheel assembly when the vehicle encounters obstacles (e.g., bumps) on a riding surface. Illustrative suspension systems include a shock absorber and a swingarm that couple the axle to the board. The suspension system may be disposed completely below a foot deck of the vehicle.

20 Claims, 4 Drawing Sheets

(56) References Cited

U.S. PATENT DOCUMENTS

| | | | |
|---|---|---|---|
| 9,707,470 B2* | 7/2017 | Ma | B62K 1/00 |
| 9,962,597 B2* | 5/2018 | Doerksen | B62K 25/00 |
| 9,999,827 B2* | 6/2018 | Wood | A63C 17/12 |
| 10,010,784 B1* | 7/2018 | Doerksen | A63C 17/0046 |
| 10,058,765 B2* | 8/2018 | Ma | A63C 17/004 |
| 10,343,050 B2* | 7/2019 | Doerksen | B62K 25/00 |
| 10,343,051 B2* | 7/2019 | Doerksen | G05D 1/0891 |
| 10,369,453 B2* | 8/2019 | Bigler | B60L 50/52 |
| 10,421,006 B1* | 9/2019 | Li | A63C 17/002 |
| 10,456,658 B1* | 10/2019 | Doerksen | B60L 15/2009 |
| 11,123,629 B1* | 9/2021 | Doerksen | A63C 17/12 |
| 11,260,905 B2* | 3/2022 | Ying | B62D 51/02 |
| 11,273,364 B1* | 3/2022 | Doerksen | A63C 17/12 |
| 11,299,059 B1* | 4/2022 | De La Rua | B60L 15/20 |
| 11,433,294 B2* | 9/2022 | Woolson | A63C 17/08 |
| 11,479,311 B2* | 10/2022 | Doerksen | B62D 37/04 |
| 2002/0074176 A1 | 6/2002 | Justus et al. | |
| 2004/0065494 A1 | 4/2004 | Nelson | |
| 2005/0121238 A1 | 6/2005 | Ishii | |
| 2007/0254789 A1* | 11/2007 | Odien | A63B 26/003 482/92 |
| 2014/0172262 A1 | 6/2014 | Andoh | |
| 2017/0120139 A1 | 5/2017 | Ma | |
| 2018/0257732 A1* | 9/2018 | Chen | B60K 7/0007 |
| 2019/0168102 A1* | 6/2019 | Doerksen | G05D 1/0891 |
| 2019/0337585 A1* | 11/2019 | Ying | B62K 23/08 |

* cited by examiner

SUSPENSION SYSTEM FOR A ONE-WHEELED VEHICLE

CROSS-REFERENCES

The following applications and materials are incorporated herein, in their entireties, for all purposes: U.S. Pat. Nos. 9,101,817; 9,352,245; 9,452,345; 9,598,141; and U.S. Provisional Pat. Application 63/088,192, filed Oct. 6, 2020.

FIELD

This disclosure relates to systems and methods for isolating a vehicle frame from effects of uneven terrain. More specifically, the disclosed embodiments relate to suspension systems for one-wheeled vehicles.

SUMMARY

The present disclosure provides systems, apparatuses, and methods relating to suspension systems for self-propelled one-wheeled vehicles.

In some examples, a self-balancing electric vehicle includes a wheel having an axis of rotation; a board including a frame having an aperture to accommodate the wheel; first and second deck portions of the board disposed on opposite sides of the aperture, each of the deck portions configured to receive a left or right foot of a rider oriented generally perpendicular to a direction of travel of the board; an electric hub motor configured to drive the wheel; a motor controller configured to receive orientation information indicating an orientation of the board and to cause the hub motor to propel the board based on the orientation information; and a suspension system including: a first swingarm having a first end fixed to an axle of the wheel and a second end pivotably coupled to the frame of the board, such that the first swingarm operatively connects the wheel to the frame of the board; and a shock absorber oriented generally parallel to the direction of travel of the board (e.g., in a fore-and-aft orientation) and coupled at a first end to the first swingarm and coupled at a second end to the frame of the board, such that the shock absorber is configured to dampen up and down movement of the board relative to the axle; wherein an entirety of the shock absorber is disposed below the first deck portion.

In some examples, a self-balancing electric vehicle includes: a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board; a wheel assembly including exactly one wheel rotatable on an axle, wherein the wheel is disposed between and extends above and below the first and second deck portions; a motor assembly configured to rotate the wheel about the axle to propel the vehicle; a motor controller configured to receive board orientation information measured by at least one sensor and to cause the motor assembly to propel the vehicle based on the board orientation information; and a suspension system coupling the wheel assembly to the board, such that the board is configured to be movable up and down relative to the axle, the suspension system including: a first swingarm having a first end fixed to an axle of the wheel and a second end pivotably coupled to the frame of the board; a second swingarm having a first end fixed to the axle and a second end pivotably coupled to the frame of the board, such that the first and second swingarms are on opposite sides of the wheel; and a shock absorber oriented generally parallel to the direction of travel of the board and coupled at a first end to the first swingarm and coupled at a second end to the frame of the board, such that the shock absorber is configured to dampen up and down movement of the board relative to the axle; wherein an entirety of the shock absorber is disposed below the first deck portion.

In some examples, a self-balancing electric vehicle includes: a wheel driven by a hub motor about an axis of rotation; a board including a frame having an aperture to accommodate the wheel, such that the board is tiltable about the wheel, first and second deck portions of the board each configured to receive a left or right foot of a rider oriented generally perpendicular to a direction of travel of the board; a motor controller configured to cause the hub motor to propel the board based on board orientation information; and a suspension system including: a first swingarm having a first end fixed to an axle of the wheel and a second end pivotably coupled to a side rail of the frame of the board, such that the first swingarm operatively connects the wheel to the frame of the board; and a shock absorber offset from a centerline of the board and oriented generally parallel to the direction of travel, wherein the shock absorber is coupled at a first end to the first swingarm and coupled at a second end to a cross member of the frame of the board, such that the shock absorber is configured to dampen up and down movement of the board relative to the axle.

Features, functions, and advantages may be achieved independently in various embodiments of the present disclosure, or may be combined in yet other embodiments, further details of which can be seen with reference to the following description and drawings.

DETAILED DESCRIPTION

Figure 1:
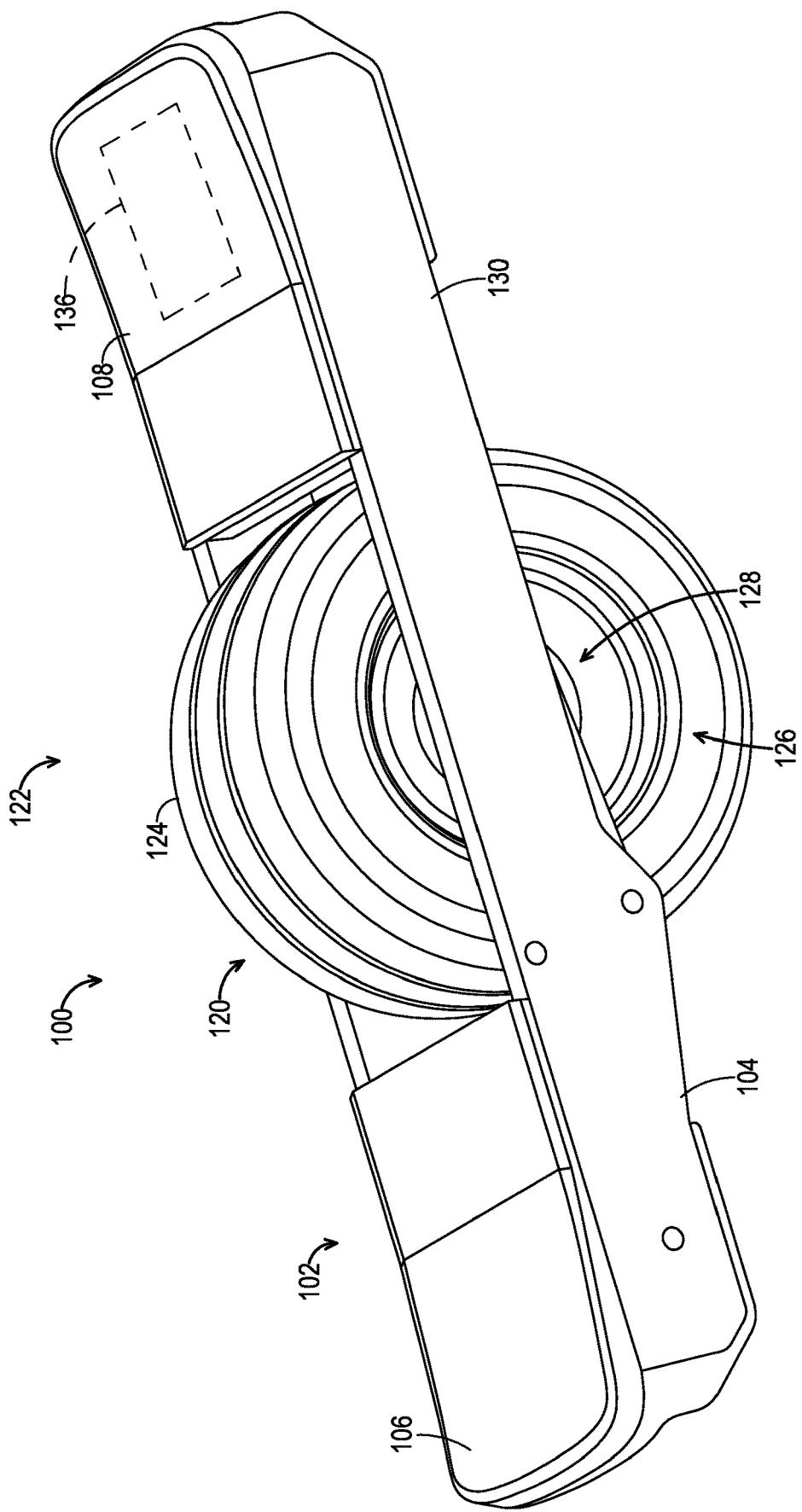
FIG. 1 is an isometric view of a one-wheeled vehicle in accordance with aspects of the present disclosure.

Various aspects and examples of swingarm suspension systems for one-wheeled vehicles, as well as related methods, are described below and illustrated in the associated drawings. Unless otherwise specified, a one-wheeled vehicle having a swingarm suspension system, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," and "rearward" (and the like) are intended to be understood in the context of a host vehicle, such as a skateboard, on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a component may have a "forward" edge, based on the fact that the component would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, suspension systems according to the present teachings are configured to be utilized with one-wheeled electric vehicles. The suspension system couples a shaft of a hub motor of the vehicle to a vehicle frame. The suspension system of the present disclosure includes a swingarm-type suspension, having a swingarm dampened by a damper or shock absorber (e.g., a gas spring).

One-wheeled electric vehicles of the present disclosure are self-stabilizing skateboards substantially similar, in aspects other than suspension systems, to the electric vehicles described in U.S. Pat. No. 9,101,817 (the '817 patent). Accordingly, one-wheeled vehicles of the present disclosure include a board, defining a riding plane. A vehicle frame supports a first deck portion and a second deck portion of the board (collectively referred to as the foot deck). Each deck portion is configured to receive a left or right foot of a rider oriented generally perpendicular to a direction of travel of the board, and the vehicle is thus configured to be ridden in the style of a skateboard.

One-wheeled vehicles of the present disclosure include a wheel assembly having a rotatable, ground-contacting element (e.g., a tire, wheel, or continuous track) disposed between and extending above the first and second deck portions. The wheel assembly further includes a hub motor, which is configured to rotate the ground-contacting element to propel the vehicle.

As described in the '817 patent, the one-wheeled vehicle includes at least one sensor configured to measure orientation information of the board, and a motor controller configured to receive orientation information measured by the sensor and to cause the hub motor to propel the vehicle based on the orientation information.

The frame may include any suitable structure configured to rigidly support the deck portions and to be coupled to an axle of the wheel assembly, such that the weight of a rider may be supported on the tiltable board, having a fulcrum at the wheel assembly axle. The frame includes one or more frame members on which the deck portions are mounted. The frame may support one or more additional elements and features of the vehicle, e.g., a charging port, end bumpers, lighting assemblies, battery and electrical systems, electronics, controllers, etc.

The deck portions may include any suitable structures configured to support the feet of a rider, such as non-skid surfaces, as well as vehicle-control features, such as a rider detection system. Illustrative deck portions, including suitable rider detection systems, are described in the '817 patent, as well as in U.S. Pat. No. 9,352,245.

As mentioned above, the hub motor is controlled by a motor controller configured to receive orientation information regarding the board. Aspects of the electrical control systems described herein (e.g., the motor controller) may be embodied as a computer method, computer system, or computer program product. Accordingly, aspects of the present control systems may include processing logic and may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the present control systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present control systems may be written in one or any combination of programming languages, including an object-oriented programming language such as Java, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the present control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts. are described in greater detail below.

Examples, Components, and Alternatives

The following sections describe selected aspects of illustrative suspension systems for one-wheeled vehicles, as well as related systems and/or methods. The examples in these sections are intended for illustration and should not be interpreted as limiting the entire scope of the present disclosure. Each section may include one or more distinct inventions, and/or contextual or related information, function, and/or structure.

A. One-Wheeled Vehicle Having an Illustrative Suspension System

With reference to FIGS. 1-4, this section describes a one-wheeled vehicle 100 having an illustrative suspension system 150, which is an example of the suspension system described above.

Vehicle 100 is a one-wheeled, self-stabilizing skateboard including a board 102 (AKA a tiltable portion of the vehicle, a platform, a foot deck) having a frame 104 supporting a first deck portion 106 and a second deck portion 108. First and second deck portions 106, 108 define between them an opening 120. Board 102 generally defines a plane. Each deck portion 106, 108 is configured to receive and support a left or right foot of a rider oriented generally perpendicular to a direction of travel of the board. For example, each deck portion may include a foot pad.

Vehicle 100 further includes a wheel assembly 122. Wheel assembly 122 includes a rotatable ground-contacting element 124 (e.g., a tire, wheel, or continuous track) disposed between and extending above first and second deck portions 106, 108, and a motor assembly 126 configured to rotate ground-contacting element 124 to propel the vehicle. In the example depicted in FIG. 1 and elsewhere, vehicle 100 includes exactly one ground-contacting element, disposed between the first and second deck portions. In some examples, vehicle 100 may include a plurality of (e.g., coaxial) ground-contacting elements.

Wheel assembly 122 is disposed between first and second deck portions 106, 108. Ground-contacting element 124 is coupled to motor assembly 126. An axle 128 (AKA a shaft) of motor assembly 126 is coupled to board 102 via suspension system 150. Motor assembly 126 is configured to rotate ground-contacting element 124 around (e.g., about) axle 128 to propel vehicle 100. For example, motor assembly 126 may include an electric motor, such as a hub motor, configured to rotate ground-contacting element 124 about axle 128 to propel vehicle 100 along the ground. For convenience, ground-contacting element 124 is hereinafter referred to as a tire or wheel, although other suitable embodiments are within the scope of the present disclosure.

First and second deck portions 106, 108 are located on opposite sides of wheel assembly 122, with board 102 being dimensioned to approximate a skateboard. In other embodiments, the board may approximate a longboard skateboard, snowboard, surfboard, or may be otherwise desirably dimensioned. In some examples, deck portions 106, 108 of board 102 are at least partially covered with a non-slip material (e.g., grip tape and/or other textured material) to aid in rider control.

Frame 104 may include any suitable structure(s) configured to rigidly support the deck portions and to be coupled to the axle of the wheel assembly by the suspension system, such that the weight of a rider is supportable on tiltable board 102. Frame 104 generally has a fulcrum at the wheel assembly axle. Frame 104 includes one or more frame members 130, on which deck portions 106 and 108 are mounted, and which may further support additional elements and features of the vehicle, such as a charging port and a power switch. Additionally, end bumpers, lighting assemblies, and/or other physical or electrical systems may be supported by frame member(s) 130.

Vehicle 100 includes an electrical control system 136. Electrical control system 136 is an example of electrical control system 200 described below with respect to FIG. 5 (see Section B). Aspects of electrical control system 136 may be incorporated into first and/or second deck portions 106, 108.

Wheel 124 is configured to be wide enough in a heel-toe direction that the rider can balance in the heel-toe direction manually, i.e., by shifting his or her own weight, without automated assistance from the vehicle. Ground-contacting element 124 may be tubeless, or may be used with an inner tube. In some examples, ground-contacting element 124 is a non-pneumatic tire. For example, ground-contacting element 124 may be "airless", solid, and/or may comprise a foam. Ground-contacting element 124 may have a profile such that the rider can lean vehicle 100 over an edge of the ground-contacting element through heel and/or toe pressure to facilitate cornering of vehicle 100.

Motor assembly 126 may include any suitable driver of ground-contacting element 124, such as a hub motor mounted within ground-contacting element 124. The hub motor may be internally geared or may be direct-drive. The use of a hub motor facilitates the elimination of chains and belts, and enables a form factor that considerably improves maneuverability, weight distribution, and aesthetics. Mounting ground-contacting element 124 onto motor assembly 126 may be accomplished by a split-rim design (e.g., using hub adapters) which may be bolted on to motor assembly 126, by casting or otherwise providing a housing of the hub motor such that it provides mounting flanges for a tire bead directly on the housing of the hub motor, or any other suitable method.

Figure 2:
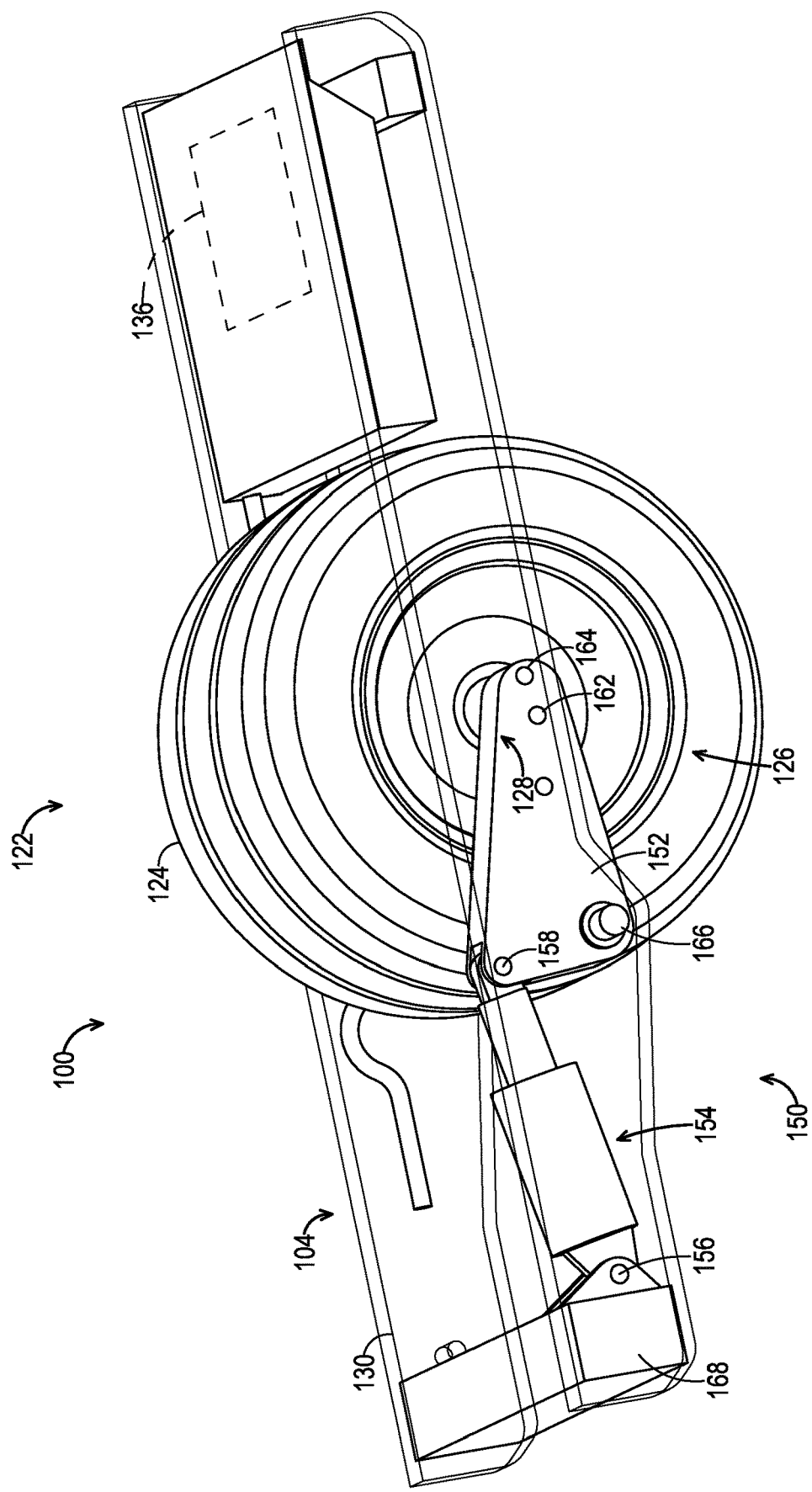
FIG. 2 is an isometric view of the one-wheeled vehicle of FIG. 1, with portions of the vehicle omitted or depicted as transparent to show an illustrative suspension system of the vehicle.

As shown in FIG. 2, motor assembly 126, and therefore ground-contacting element 124, is coupled to frame 104 by suspension system 150. In FIG. 2, frame members 130 are depicted as transparent, allowing aspects of suspension system 150 to be seen. In the example depicted in FIG. 2, suspension system 150 is generally disposed below first deck portion 106. In some examples, suspension system 150 is instead generally disposed below second deck portion 108. In either case, the board may be ridden in either direction, such that the suspension can be considered to be in the "front" or "rear" end of the vehicle, depending on the location of the suspension and on the direction of travel.

With continued reference to FIG. 2, suspension system 150 includes a first swingarm 152 coupled to a shock absorber 154. The swingarm and shock absorber, (and in some examples, suspension system 150 as a whole) may be disposed completely below the foot deck. Swingarm 152 is a rigid (i.e., inflexible) structure, depicted in FIG. 2 as having a generally triangular shape. In some examples swingarm 152 may be L-shaped, or otherwise suitably shaped.

A first end of swingarm 152 is coupled to axle 128, such that the swingarm and the axle rotate together (i.e., the swingarm does not rotate with respect to the axle). As shown in FIG. 2 and elsewhere, swingarm 152 is attached to axle 128 using a pair of spaced apart axle mounting members 162, 164. In the example depicted in FIGS. 2-4, axle mounting members 162, 164 are removable fasteners such as threaded screws or bolts. The use of two mounting members on the axle in this manner enables the board to be tilted/rotated, e.g., while riding, without risking the unthreading or otherwise loosening of the mounting members from the axle. As the axes of the two mounting members are offset from the axis of the axle, torque on the mounting members is reduced. Additionally, the two mounting members rigidly connect the swingarm to the axle such that the swingarm cannot pivot or otherwise rotate with respect to the axle.

Swingarm 152 is pivotably attached to vehicle 100 by support member 166. Support member 166 may include any suitable structure configured to facilitate rotation about a horizontal axis, such as a pin fitting into a socket or aperture of the swingarm. In some examples, support member 166 is rigidly attached to frame member 130. For example, support member 166 may be affixed (e.g., bolted) to frame member 130. In some examples, at least portions of support member 166 are unitary with frame member 130 (e.g., the frame member and portions of the support members may be formed as a single piece). In some examples, support member 166 includes one or more bearings, bushings, washers, and/or other suitable components for facilitating the pivoting of swingarm 152. In some examples, the pin or similar member is fixedly attached to the swingarm and rotatable in a socket, bearing, or bushing of the side rail. In general, pivot bearings or the like may be disposed in either the swingarm blades or the frame.

Accordingly, swingarm 152 is pivotable about an axis defined by support member 166 with respect to board 102 and frame 104. This pivotable arrangement facilitates a swinging, generally vertical movement of motor assembly 126 (and therefore wheel assembly 122) with respect to the board. In other words, the wheel can move up and down with respect to the board, through an arc corresponding to a radius defined by the distance between support member 166 and axle 128 (i.e., arcuate motion, also referred to as arcuately vertical motion).

However, this motion of the wheel is generally only desirable in response to a need, such as when riding the vehicle over a bump in the road or on uneven terrain. Furthermore, the motion should be controlled or damped to allow for rider control and comfort. Accordingly, suspension system 150 includes shock absorber 154 (e.g., a gas spring), configured to bias the swing arm and board toward a desired riding configuration (e.g., board height and orientation with respect to the axle), including when the rider is aboard. Suspension system 150 is biased toward a particular configuration by the shock, and functions to facilitate relative motion between the wheel and the board (i.e., the frame). Although the wheel is described above as being movable with respect to the board, the opposite is also true, wherein the board may be described as being movable with respect to the wheel.

Shock absorber 154 is pivotably coupled at a first end to swingarm 152 by a first pivotal connection 158. Accordingly, swingarm 152 acts as a first-class lever, in which effort is applied at axle mounting members 162, 164, thereby causing rotation about a fulcrum (i.e., support member 166) and transferring the force to shock absorber 154 at pivotal connection 158.

Shock absorber 154 is pivotably coupled at a second end to a rigid, transverse support bar 168 by a second pivotal connection 156. Although second pivotal connection 156 is disposed slightly lower (i.e., closer to the ground) than first pivotal connection 158, shock absorber 154 is oriented generally parallel to the direction of travel when viewed from a top-down perspective. In other words, shock absorber 154 is coupled to swingarm 152 and transverse support bar 168 in a generally fore and aft orientation.

Transverse support bar 168 spans frame 104 and is rigidly attached at respective ends to respective frame members 130, e.g., below deck portion 106. Support bar 168 provides structural support for suspension system 150 by both partially supporting the user's weight and pivotally anchoring shock absorber 154 to frame 104. Accordingly, support bar 168 comprises a sufficiently strong and long-lasting material, e.g., steel, titanium, etc.

Shock absorber 154 may include any suitable damping device. In the example depicted in FIGS. 2-4, shock absorber 154 includes an air shock absorber. Damping characteristics of the shock may be adjustable or selectable. In some examples, the shock may include a lockout feature.

Figure 3:
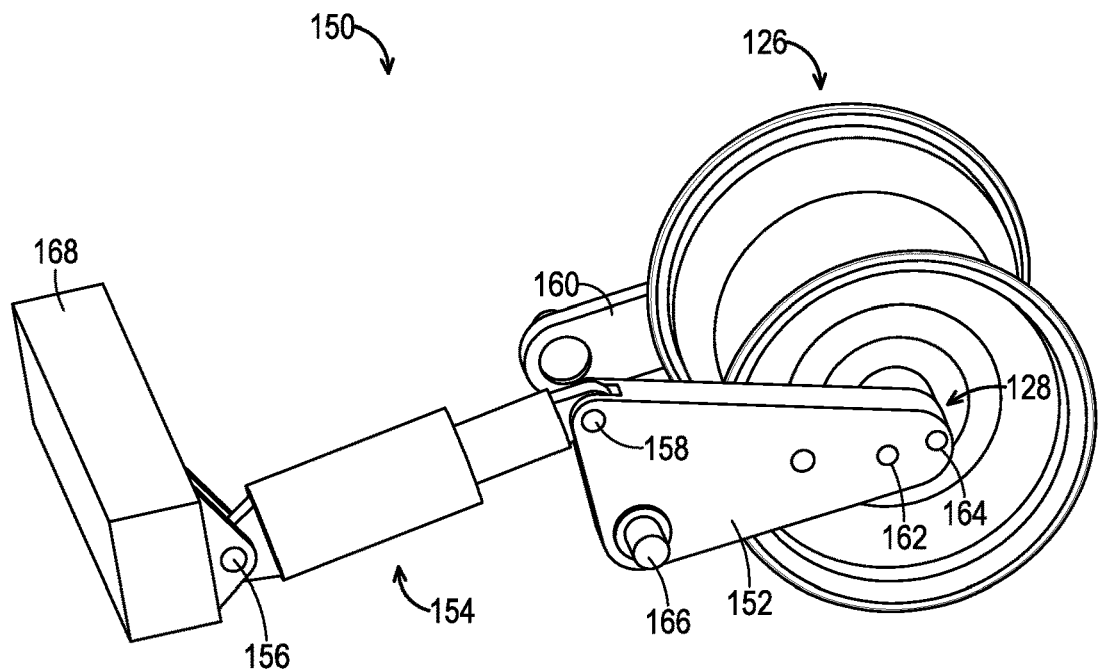
FIG. 3 is an isometric view of the suspension system of FIG. 2.
Figure 4:
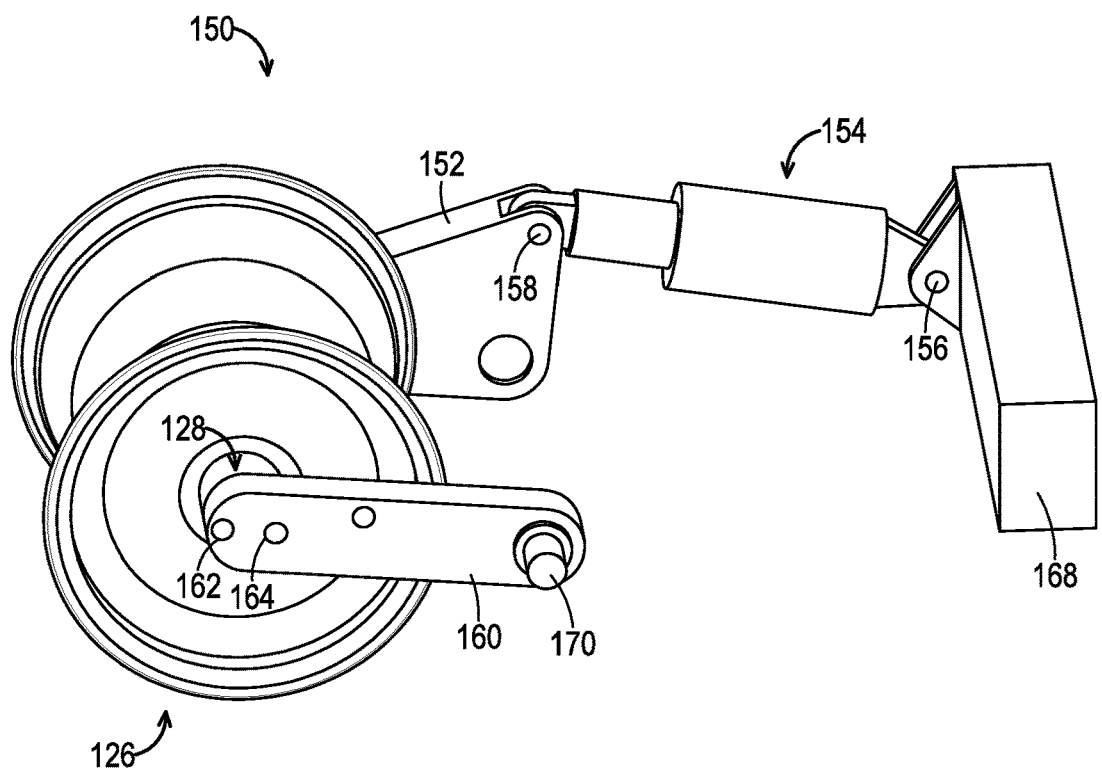
FIG. 4 is another isometric view of the suspension system of FIG. 2.

As shown in FIGS. 3 and 4, additional support is provided by a second swingarm 160, disposed opposite swingarm 152.

Swingarm 160 is pivotably attached to frame 104 by a support member 170. In some examples, support member 170 is affixed (e.g., bolted) to frame member 130. In some examples, portions of support member 170 are unitary with frame member 130 (e.g., the frame member and portions of the support members may be formed as a single piece). In some examples, support member 170 includes one or more bearings, bushings, washers, and/or other suitable components for facilitating the pivoting of swingarm 152.

As shown in FIG. 4, a distal end of swingarm 160 is coupled to axle 128 by a pair of spaced apart axle mounting members 162, 164, such that the swingarm and the axle rotate together (i.e., the swingarm does not rotate with respect to the axle). Accordingly, the pivoting of swingarm 160 is unitary with and simultaneous to the pivoting of swingarm 152.

Swingarm 152 and swingarm 160 may be described as two parts (blades) of a single overall swingarm. In some examples, axle 128 forms a torsional coupling of the two swingarm blades. In some examples, an additional torsion member couples the two swingarm blades (i.e., swingarms 152, 160) to each other. This additional torsion member may be disposed, for example, between the wheel and support members 166, 170.

The dampening operation of suspension system 150 occurs as follows: the upward arcuate motion of wheel assembly 122 (and therefore motor assembly 126) causes an upward rotation of swingarms 152, 160 about respective support members 166, 170, thereby causing a corresponding compression of shock absorber 154 due to the connection of shock absorber 154 to swingarm 152 at pivotal connection 158.

B. Electrical Control System

Figure 5:
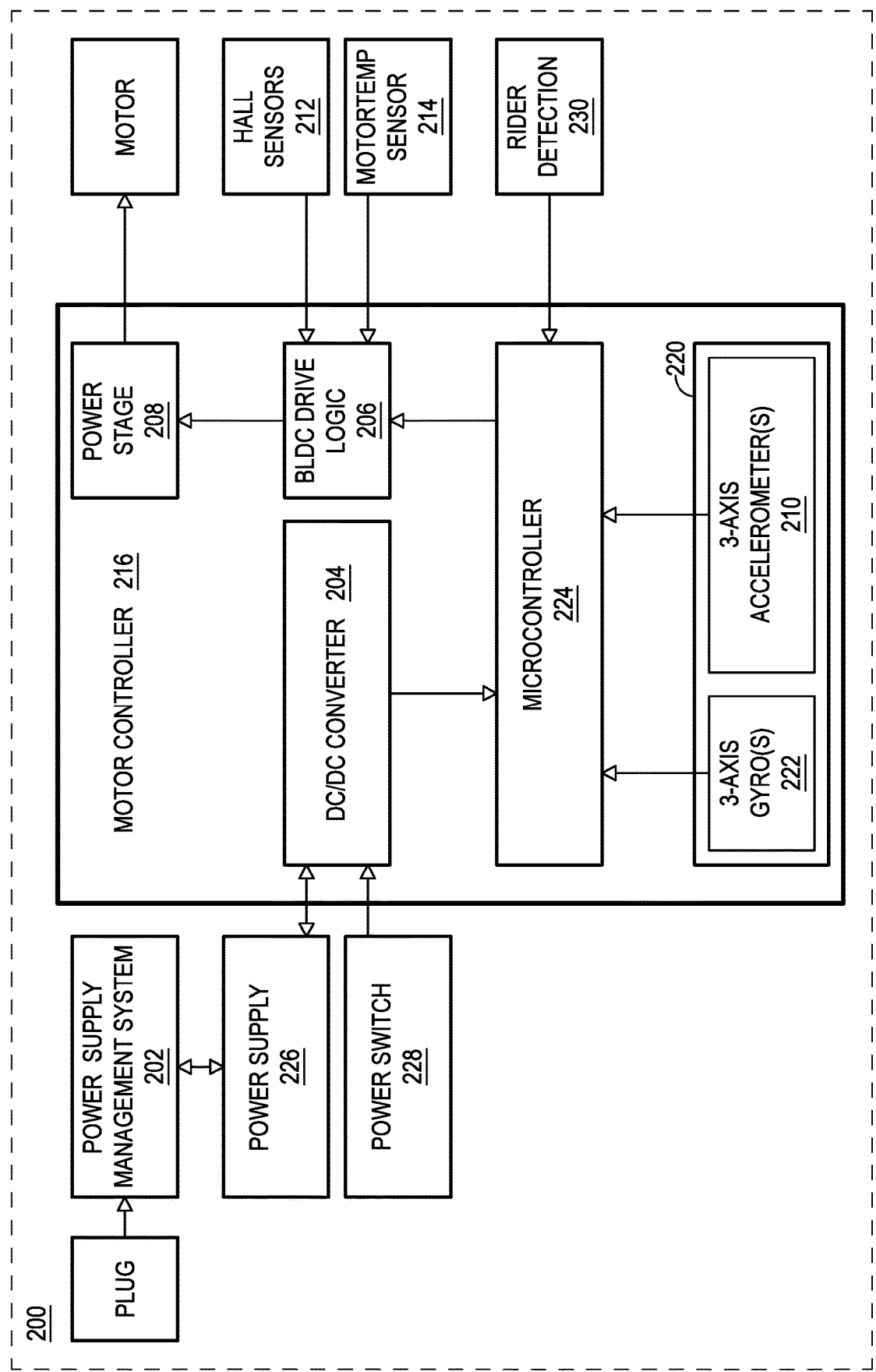
FIG. 5 is a schematic diagram depicting an illustrative electrical control system suitable for use with a vehicle in accordance with aspects of the present disclosure.

FIG. 5 shows a block diagram of an illustrative electrical control system 200, which is an example of electrical control systems 136 and 236 described briefly above, comprising various illustrative electrical components of vehicle 100. These electrical components include a power supply management system 202, a direct current to direct current (DC/DC) converter 204, a brushless direct current (BLDC) drive logic 206, a power stage 208, one or more 2-axis accelerometers 210, one or more hall sensors 212, and/or a motor temperature sensor 214. DC/DC converter 204, BLDC drive logic 206, and power stage 208 may be included in and/or connected to a motor controller 216. Accelerometer(s) 210 may be included in one or more orientation or tilt sensors 218, which are examples of the orientation sensor mentioned elsewhere herein.

Active balancing (or self-stabilization) of the electric vehicle may be achieved through the use of a feedback control loop or mechanism. The feedback control mechanism includes sensors 220, which are electrically coupled to and/or included in motor controller 216. In some examples, the feedback control mechanism includes a Proportional-Integral-Derivative (PID) control scheme using one or more gyros 222 and one or more accelerometers (e.g., accelerometer(s) 210). Gyro 222 may be configured to measure a pivoting of the board about its pitch axis (also referred to as the fulcral axis). Gyro 222 and accelerometer 210 are collectively configured to estimate (or measure, or sense) a lean angle of the board, such as an orientation of the foot deck about the pitch, roll and/or yaw axes. In some embodiments, gyro 222 and accelerometer 210 are collectively configured to sense orientation information sufficient to estimate the lean angle of the frame, including pivotation about the pitch, roll and/or yaw axes.

As mentioned above, orientation information of the board may be measured (or sensed) by gyro 222 and accelerometer 210. In some examples, the respective measurements (or sense signals) from gyro 222 and accelerometer 210 are combined using a complementary or Kalman filter to estimate a lean angle of the board (e.g., pivoting of the board about the pitch, roll, and/or yaw axes, with pivoting about the pitch axis corresponding to a pitch angle, pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 222 and accelerometer 210 may be connected to a microcontroller 224, which may be configured to correspondingly measure movement of the board about and along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop is configured to drive the motor to reduce an angle of the board with respect to the ground. For example, if a rider were to angle the board downward, so that the first deck portion was 'lower' than the second deck portion (e.g., if the rider pivoted the board in a first rotational direction), then the feedback loop may drive the motor to cause rotation of tire about the pitch axis in the first rotational direction, thereby causing a force on the board in the second, opposing rotational direction.

Thus, motion of the electric vehicle may be achieved by the rider leaning his or her weight toward a selected (e.g., "front") foot. Similarly, deceleration may be achieved by the rider leaning toward the other (e.g., "back") foot. Regenerative braking can be used to slow the vehicle. Sustained operation may be achieved in either direction by the rider maintaining their lean toward either selected foot.

As indicated in FIG. 5, microcontroller 224 is configured to send a signal to brushless DC (BLDC) drive logic 206, which may communicate information relating to the orientation and motion of the board. BLDC drive logic 206 then interprets the signal and communicates with power stage 208 to drive the motor accordingly. Hall sensors 212 may send a signal to the BLDC drive logic to provide feedback regarding a substantially instantaneous rotational rate of the rotor of the motor. In some examples, motor temperature sensor 214 is configured to measure a temperature of the motor and send this measured temperature to logic 206. Logic 206 may limit an amount of power supplied to the motor based on the measured temperature of the motor to prevent the motor from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measure or estimated pitch angle of the board).

Alternatively or additionally, some embodiments include neural network control, fuzzy control, genetic algorithm control, linear quadratic regulator control, state-dependent Riccati equation control, and/or other control algorithms. In some embodiments, absolute or relative encoders are incorporated to provide feedback on motor position.

During turning, the pitch angle can be modulated by the heel-toe angle (e.g., pivoting of the board about the roll axis), which may improve performance and prevent a front inside edge of the board from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 5, the various electrical components are configured to manage a power supply 226. For example, power supply management system 202 may be a battery management system configured to protect batteries of power supply 226 from being overcharged, over-discharged, and/or short-circuited. System 202 may monitor battery health, a state of charge in power supply 226, and/or increase the safety of the vehicle. Power supply management system 202 may be connected between a charge plug of the vehicle and power supply 226. The rider (or other user) can couple a charger to the plug and re-charge power supply 226 via system 202.

In operation, power switch 228 is activated (e.g., by the rider). Activation of switch 228 sends a power-on signal to converter 204. In response to the power-on signal, converter 204 may convert direct current from a first voltage level provided by power supply 226 to one or more other voltage levels. The other voltage levels may be different than the first voltage level. Converter 204 may be connected to the other electrical components via one or more electrical connections to provide these electrical components with suitable voltages.

Converter 204 (or other suitable circuitry) may transmit the power-on signal to microcontroller 224. In response to the power-on signal, microcontroller may initialize sensors 220, and a rider detection device 230.

The electric vehicle may include one or more safety mechanisms, such as power switch 228 and/or rider detection device 230 to ensure that the rider is on the board before engaging the feedback control loop. In some embodiments, rider detection device 230 may be configured to determine if the rider's feet are disposed on the foot deck, and to send a signal causing the motor to enter an active state when the rider's feet are determined to be disposed on the foot deck.

Rider detection device 230 may include any suitable mechanism, structure, or apparatus for determining whether the rider is on the electric vehicle. For example, device 230 may include one or more mechanical buttons, one or more capacitive sensors, one or more inductive sensors, one or more optical switches, one or more force resistive sensors, and/or one or more strain gauges. Rider detection device 230 may be located on or under either or both of the first and second deck portions. In some examples, the one or more mechanical buttons or other devices may be pressed directly (e.g., if on the deck portions), or indirectly (e.g., if under the deck portions), to sense whether the rider is on the board.

In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, rider detection device 230 may include a hand-held "dead-man" switch.

If device 230 detects that the rider is suitably positioned on the electric vehicle, then device 230 may send a rider-present signal to microcontroller 224. The rider-present signal may be the signal causing the motor to enter the active state. In response to the rider-present signal (and/or, for example, the board being moved to the level orientation), microcontroller 224 may activate the feedback control loop for driving the motor. For example, in response to the rider-present signal, microcontroller 224 may send board orientation information (or measurement data) from sensors 220 to logic 206 for powering the motor via power stage 208.

In some embodiments, if device 238 detects that the rider is no longer suitably positioned or present on the electric vehicle, device 238 may send a rider-not-present signal to microcontroller 224. In response to the rider-not-present signal, circuitry of the vehicle (e.g., microcontroller 224, logic 206, and/or power stage 208) may be configured to reduce a rotational rate of the rotor relative to the stator to bring the vehicle to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle is configured to actively drive the motor even though the rider may not be present on the vehicle (e.g., temporarily), which may allow the rider to perform various tricks. For example, rider detection device 230 may be configured to delay sending the rider-not-present signal to the microcontroller for a predetermined duration of time, and/or the microcontroller may be configured to delay sending the signal to logic 206 to cut power to the motor for a predetermined duration of time.

C. Illustrative Combinations and Additional Examples

This section describes additional aspects and features of the suspension systems described herein, presented without limitation as a series of paragraphs, some or all of which may be alphanumerically designated for clarity and efficiency. Each of these paragraphs can be combined with one or more other paragraphs, and/or with disclosure from elsewhere in this application, including any materials listed in the Cross-References, in any suitable manner. Some of the paragraphs below may expressly refer to and further limit other paragraphs, providing without limitation examples of some of the suitable combinations.

A0. A self-balancing electric vehicle comprising:
 a wheel having an axis of rotation;
 a board including a frame having an aperture to accommodate the wheel,
 first and second deck portions of the board disposed on opposite sides of the aperture, each of the deck portions configured to receive a left or right foot of a rider oriented generally perpendicular to a direction of travel of the board;
 an electric hub motor configured to drive the wheel;
 a motor controller configured to receive orientation information indicating an orientation of the board and to cause the hub motor to propel the board based on the orientation information; and
 a suspension system including:
  a first swingarm having a first end fixed to an axle of the wheel and a second end pivotably coupled to the frame of the board, such that the first swingarm operatively connects the wheel to the frame of the board; and
  a shock absorber oriented in a fore-and-aft direction with respect to the board and coupled at a first end to the first swingarm and coupled at a second end to the frame of the board, such that the shock absorber is configured to dampen up and down movement of the board relative to the axle;
 wherein an entirety of the shock absorber is disposed below the first deck portion.

A1. The vehicle of A0, wherein the second end of the first swingarm is pivotably coupled to the board at a first pivot joint, and the shock absorber is coupled to the first swingarm at a second joint spaced apart from the first pivot joint.

A2. The vehicle of A1, wherein the second joint is above the first pivot joint.

A3. The vehicle of any one of paragraphs A0 through A2, further comprising a second swingarm having a first end fixed to the axle and a second end pivotably coupled to the frame of the board, such that the first and second swingarms are on opposite sides of the wheel.

A4. The vehicle of any one of paragraphs A0 through A3, wherein the first swingarm is disposed entirely below the first deck portion.

A5. The vehicle of any one of paragraphs A0 through A4, wherein the second end of the shock absorber is pivotably coupled to a cross member of the frame.

A6. The vehicle of any one of paragraphs A0 through A5, wherein the frame is coupled to the axle by only the suspension system.

B0. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including exactly one wheel rotatable on an axle, wherein the wheel is disposed between and extends above and below the first and second deck portions;
a motor assembly configured to rotate the wheel about the axle to propel the vehicle;
a motor controller configured to receive board orientation information measured by at least one sensor and to cause the motor assembly to propel the vehicle based on the board orientation information; and
a suspension system coupling the wheel assembly to the board, such that the board is configured to be movable up and down relative to the axle, the suspension system including:
a first swingarm having a first end fixed to an axle of the wheel and a second end pivotably coupled to the frame of the board;
a second swingarm having a first end fixed to the axle and a second end pivotably coupled to the frame of the board, such that the first and second swingarms are on opposite sides of the wheel; and
a shock absorber oriented generally parallel to the direction of travel of the board and coupled at a first end to the first swingarm and coupled at a second end to the frame of the board, such that the shock absorber is configured to dampen up and down movement of the board relative to the axle;
wherein an entirety of the shock absorber is disposed below the first deck portion.

B1. The vehicle of B0, wherein the first and second swingarms are disposed entirely below the first deck portion.

B2. The vehicle of B0 or B1, wherein the second end of the first swingarm is pivotably coupled to a side rail of the frame at a first pivot joint, and the first swingarm is pivotably coupled to the shock absorber at a second joint spaced apart from the first pivot joint.

B3. The vehicle of B2, wherein the second joint is above the first pivot joint.

B4. The vehicle of B3, wherein the first swingarm is generally triangular.

B5. The vehicle of any one of paragraphs B0 through B4, wherein the second end of the shock absorber is pivotably coupled to a cross member of the frame.

B6. The vehicle of any one of paragraphs B0 through B5, wherein the frame is coupled to the axle by only the suspension system.

C0. A self-balancing electric vehicle comprising:
a wheel driven by a hub motor about an axis of rotation;
a board including a frame having an aperture to accommodate the wheel, such that the board is tiltable about the wheel, first and second deck portions of the board each configured to receive a left or right foot of a rider oriented generally perpendicular to a direction of travel of the board;
a motor controller configured to cause the hub motor to propel the board based on board orientation information; and
a suspension system including:
a first swingarm having a first end fixed to an axle of the wheel and a second end pivotably coupled to a side rail of the frame of the board, such that the first swingarm operatively connects the wheel to the frame of the board; and
a shock absorber offset from a centerline of the board and oriented in a fore-and-aft direction, wherein the shock absorber is coupled at a first end to the first swingarm and coupled at a second end to a cross member of the frame of the board, such that the shock absorber is configured to dampen up and down movement of the board relative to the axle.

C1. The vehicle of C0, wherein the second end of the first swingarm is pivotably coupled to the side rail at a first pivot joint, and the first swingarm is pivotably coupled to the shock absorber at a second joint spaced apart from the first pivot joint.

C2. The vehicle of C1, wherein the second joint is above the first pivot joint.

C3. The vehicle of C2, wherein the first swingarm is triangular.

C4. The vehicle of any one of paragraphs C0 through C3, wherein an entirety of the shock absorber is disposed below the first deck portion.

C5. The vehicle of any one of paragraphs C0 through C4, wherein the frame is coupled to the axle by only the suspension system.

Advantages, Features, and Benefits

The different embodiments and examples of the suspension systems described herein provide several advantages over known solutions for providing suspension for a one-wheeled vehicle. For example, illustrative embodiments and examples described herein allow for a more sensitive adjustment of shock absorbing characteristics.

Additionally, illustrative embodiments and examples described herein allow for a more robust load-bearing connection between the suspension system and the wheel assembly.

Additionally, illustrative embodiments and examples described herein allow for the full use of the footpads/deck, because few or no portions of the suspension system extend above or are disposed on the top surface of the board.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A self-balancing electric vehicle comprising:
a wheel having an axis of rotation;
a board including a frame having an aperture to accommodate the wheel, first and second deck portions of the board disposed on opposite sides of the aperture, each of the deck portions configured to receive a left or right foot of a rider oriented generally perpendicular to a direction of travel of the board;
an electric hub motor configured to drive the wheel;
a motor controller configured to receive orientation information indicating an orientation of the board and to cause the hub motor to propel the board based on the orientation information; and
a suspension system including:
a first rigid, one-piece swingarm having a first end fixed to an axle of the wheel and a second end attached to the vehicle by a support member rigidly attached to the frame, such that the second end is pivotable with respect to the frame about an axis defined by the support member; and
a shock absorber oriented in a fore-and-aft direction with respect to the board, wherein a first end of the shock absorber is coupled to the first swingarm at a floating pivot joint of the first swingarm and a second end of the shock absorber is coupled to the frame of the board at a fixed pivot joint, such that the shock absorber is configured to dampen up and down movement of the board relative to the axle;
wherein an entirety of the shock absorber is disposed below the first deck portion.

2. The vehicle of claim 1, wherein the second end of the first swingarm is pivotably coupled to the frame of the board at a first pivot joint, and the floating pivot joint is spaced apart from the first pivot joint.

3. The vehicle of claim 2, wherein the floating pivot joint is above the first pivot joint.

4. The vehicle of claim 1, further comprising a second swingarm having a first end fixed to the axle and a second end pivotably coupled to the frame of the board, such that the first and second swingarms are on opposite sides of the wheel.

5. The vehicle of claim 1, wherein the first swingarm is disposed entirely below the first deck portion.

6. The vehicle of claim 1, wherein the second end of the shock absorber is pivotably coupled to a cross member of the frame.

7. The vehicle of claim 1, wherein the frame is coupled to the axle by only the suspension system.

8. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including exactly one wheel rotatable on an axle, wherein the wheel is disposed between and extends above and below the first and second deck portions;
a motor assembly configured to rotate the wheel about the axle to propel the vehicle;
a motor controller configured to receive board orientation information measured by at least one sensor and to cause the motor assembly to propel the vehicle based on the board orientation information; and
a suspension system coupling the wheel assembly to the board, such that the board is configured to be movable up and down relative to the axle, the suspension system including:
a first rigid, one-piece swingarm having a first end fixed to an axle of the wheel and a second end attached to the vehicle by a first support member rigidly attached to the frame, such that the second end is pivotable with respect to the frame about an axis defined by the first support member;
a second rigid, one-piece swingarm having a first end fixed to the axle and a second end attached to the vehicle by a second support member rigidly attached to the frame, such that the second end is pivotable with respect to the frame about an axis defined by the second support member and the first and second swingarms are on opposite sides of the wheel; and
a shock absorber oriented generally parallel to the direction of travel of the board, wherein a first end of the shock absorber is coupled to the first swingarm at a floating pivot joint of the first swingarm and a second end of the shock absorber is coupled to the frame of the board at a fixed pivot joint, such that the shock absorber is configured to dampen up and down movement of the board relative to the axle;
wherein an entirety of the shock absorber is disposed below the first deck portion.

9. The vehicle of claim 8, wherein the first and second swingarms are disposed entirely below the first deck portion.

10. The vehicle of claim 8, wherein the second end of the first swingarm is pivotably coupled to a side rail of the frame at a first pivot joint, and the floating pivot joint is spaced apart from the first pivot joint.

11. The vehicle of claim 10, wherein the floating pivot joint is above the first pivot joint.

12. The vehicle of claim 11, wherein the first swingarm is generally triangular.

13. The vehicle of claim 8, wherein the second end of the shock absorber is pivotably coupled to a cross member of the frame.

14. The vehicle of claim 8, wherein the frame is coupled to the axle by only the suspension system.

15. A self-balancing electric vehicle comprising:
a wheel driven by a hub motor about an axis of rotation;
a board including a frame having an aperture to accommodate the wheel, such that the board is tiltable about the wheel, first and second deck portions of the board each configured to receive a left or right foot of a rider oriented generally perpendicular to a direction of travel of the board;
a motor controller configured to cause the hub motor to propel the board based on board orientation information; and
a suspension system including:
a first rigid, one-piece swingarm having a first end fixed to an axle of the wheel and a second end pivotably coupled to a side rail of the frame of the board by a support member rigidly attached to the frame, such that the second end of the first swingarm is pivotable with respect to the frame about an axis defined by the support member; and
a shock absorber offset from a centerline of the board and oriented in a fore-and-aft direction, wherein a first end of the shock absorber is coupled to the first swingarm at a pivot joint of the first swingarm which is movable relative to the frame and a second end of the shock absorber is coupled to a cross member of the frame of the board at a pivot joint which is fixed relative to the cross member, such that the shock absorber is configured to dampen up and down movement of the board relative to the axle.

16. The vehicle of claim 15, wherein the second end of the first swingarm is pivotably coupled to the side rail at a first pivot joint, and the pivot joint which is movable relative to the frame is spaced apart from the first pivot joint.

17. The vehicle of claim 16, wherein the pivot joint which is movable relative to the frame is above the first pivot joint.

18. The vehicle of claim 17, wherein the first swingarm is generally triangular.

19. The vehicle of claim 15, wherein an entirety of the shock absorber is disposed below the first deck portion.

20. The vehicle of claim 15, wherein the frame is coupled to the axle by only the suspension system.

\* \* \* \* \*